United States Patent
Ishii et al.

(10) Patent No.: US 8,063,865 B2
(45) Date of Patent: Nov. 22, 2011

(54) LIQUID CRYSTAL DISPLAY COMPRISING ELECTROSTATIC PROTECTION CIRCUIT AND TEST CIRCUIT

(75) Inventors: Hiromitsu Ishii, Mitaka (JP); Yayoi Nakamura, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 840 days.

(21) Appl. No.: 11/985,491

(22) Filed: Nov. 15, 2007

(65) Prior Publication Data

US 2008/0117345 A1 May 22, 2008

(30) Foreign Application Priority Data

Nov. 22, 2006 (JP) .................. 2006-315152

(51) Int. Cl.
*G09G 3/36* (2006.01)

(52) U.S. Cl. ...... 345/98; 345/904; 348/180; 324/760.01

(58) Field of Classification Search .................... 345/98, 345/100, 206, 87, 92; 349/149
See application file for complete search history.

(56) References Cited

U.S. PATENT DOCUMENTS 6,340,963 B1 * 1/2002 Anno et al. ..................... 345/92

6,882,397 B2 * 4/2005 Hayata et al. ................. 349/149

FOREIGN PATENT DOCUMENTS

JP 2005-93459 A 4/2005
JP 2005093459 A * 4/2005

* cited by examiner

*Primary Examiner* — Quan-Zhen Wang
*Assistant Examiner* — Troy Dalrymple
(74) *Attorney, Agent, or Firm* — Holtz, Holtz, Goodman & Chick, PC

(57) ABSTRACT

A display includes a substrate provided with a display region and a non-display region. A plurality of display electrodes are arranged on the substrate. A plurality of switching elements are respectively connected to the display electrodes. Each of the switching elements includes a control electrode and a data electrode. A plurality of scan lines are respectively connected to the control electrodes of the switching elements. A plurality of data lines are respectively connected to the data electrodes of the switching elements. A scan line electrostatic protection and test circuit is provided in the non-display region and connected to the scan lines The scan line electrostatic protection and test circuit includes an electrostatic protection circuit provided with a protection element which is normally in a non-conduction state and is set in a conduction state by generated static electricity, and an inspection circuit to inspect a conduction state of the scan lines by way of the protection element.

12 Claims, 11 Drawing Sheets

LIQUID CRYSTAL DISPLAY COMPRISING ELECTROSTATIC PROTECTION CIRCUIT AND TEST CIRCUIT

CROSS-REFERENCE TO RELATED APPLICATIONS

This application is based upon and claims the benefit of priority from prior Japanese Patent Application No. 2006-315152, filed Nov. 22, 2006, the entire contents of which are incorporated herein by reference.

BACKGROUND OF THE INVENTION

1. Field of the Invention

This invention relates to a liquid crystal display comprising an electrostatic protection circuit and a test circuit.

2. Description of the Related Art

In conventional active matrix type liquid crystal displays, there is a need to prevent faults such as a characteristic shift and dielectric breakdown of a switching thin film transistor due to static electricity. Jpn. Pat. Appln. KOKAI Publication No. 2005-93459 has disclosed a liquid crystal display having an electrostatic protection circuit for preventing such faults. This electrostatic protection circuit is provided outside a display region where there are provided pixel electrodes in the vicinity of intersections between a plurality of scan lines and a plurality of data lines that are provided in matrix form and switching thin film transistors connected to the pixel electrodes. This electrostatic protection circuit comprises a plurality of scan line electrostatic protection lines, a scan line electrostatic protection thin film transistor provided between each scan line electrostatic protection line and each scan line, a plurality of data line electrostatic protection lines, and a data line electrostatic protection thin film transistor provided between each data line electrostatic protection line and each data line.

In the above-mentioned conventional liquid crystal display, the scan line electrostatic protection lines and the scan line electrostatic protection thin film transistors, and the data line electrostatic protection lines and the data line electrostatic protection thin films are provided outside the display region, and securing regions to arrange these components leads to a problem of an increased frame size. Here, the frame size means the size of a non-display region in a display panel of the liquid crystal display, and this size is called the frame size because a region except for the display region in the display panel of the liquid crystal display is shaped into a frame for housing a picture.

Furthermore, when such a conventional liquid crystal display is inspected for, for example, a line defect, a test terminal may be provided outside the display region on the opposite sides of the regions where the scan line electrostatic protection thin film transistors and the data line electrostatic protection thin film transistors are provided. In that case, in order to selectively drive the scan lines and the data lines, a scan line test thin film transistor and a data line test thin film transistor have to be arranged between the test terminal and each scan line and each data line, and securing regions to arrange these components leads to a problem of a further increased frame area.

BRIEF SUMMARY OF THE INVENTION

It is therefore an object of this invention to provide a liquid crystal display enabling a smaller frame area.

A display according to one aspect of the present invention comprises a substrate including a display region and a non-display region. A plurality of display electrodes are arranged on the substrate. A plurality of switching elements are respectively connected to the display electrodes, each of the switching elements including a control electrode and a data electrode. A plurality of scan lines are respectively connected to the control electrodes of the switching elements. A plurality of data lines are respectively connected to the data electrodes of the switching elements. A scan line electrostatic protection and test circuit is provided in the non-display region and connected to the scan lines, the scan line electrostatic protection and test circuit comprising an electrostatic protection circuit including a protection element which is normally in a non-conduction state and is set in a conduction state by generated static electricity, and an inspection circuit to inspect a conduction state of the scan lines by way of the protection element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

DETAILED DESCRIPTION OF THE INVENTION

First Embodiment

Figure 1:
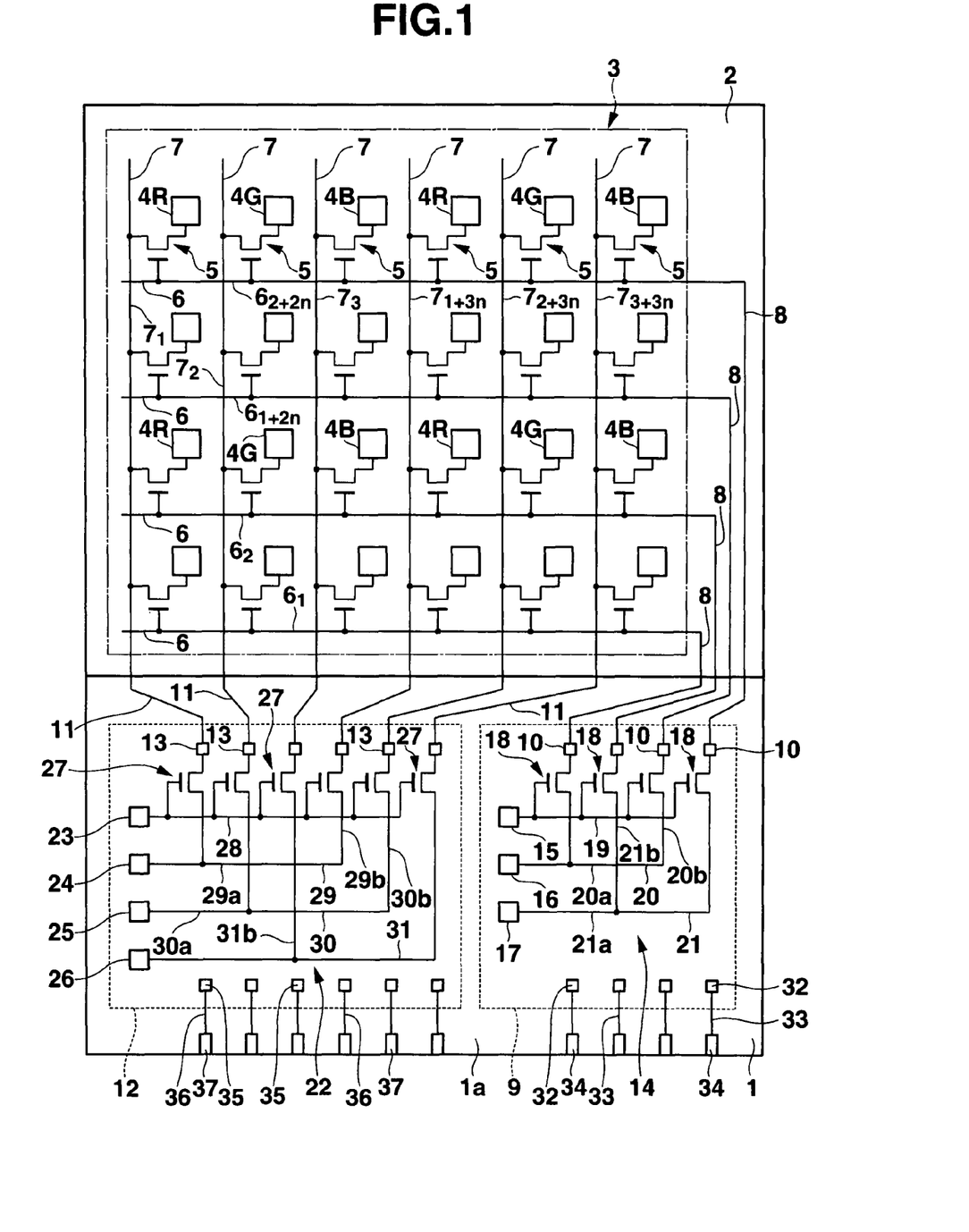
FIG. 1 is a plan view showing equivalent circuits in essential parts of a liquid crystal display according to a first embodiment of this invention.

FIG. 1 is a plan view showing equivalent circuits in essential parts of a liquid crystal display as a first embodiment of this invention. This liquid crystal display includes an active substrate 1 and an opposite substrate 2 located above the active substrate 1 which are bonded together via a substantially square frame-shaped seal member (not shown), and liquid crystal (not shown) sealed between the substrates 1 and 2 inside the seal member. The active substrate 1 is longer than the opposite substrate 2, and a lower side portion of the active substrate 1 projects from the opposite substrate 2. The projecting portion is hereinafter referred to as a projection 1a. In addition, a square region enclosed by a dashed-dotted line in FIG. 1 is a display region 3.

In the display region 3 on the active substrate 1, there are provided a plurality of groups of red, green and blue display pixel electrodes (display electrodes) 4R, 4G, 4B arranged in matrix form, a switching thin film transistor 5 having one source/drain electrode connected to each of the pixel electrodes 4R, 4G, 4B, a plurality of scan lines 6 each of which extends in a row direction and which supplies a scan signal to a gate electrode (control electrode) of each switching thin film transistor 5, and a plurality of data lines 7 each of which supplies a data signal to the other source/drain electrode (data electrode) of each switching thin film transistor 5. The scan lines 6 are arranged in parallel with each other and extend from one side to the opposite side of the substrate 1 (from a left side to a right side in FIG. 1), and the data lines 7 are arranged in parallel with each other and extend from the other side to the opposite side of the substrate 1 (from a lower side to an upper side in FIG. 1).

Here, 4×6 pixel electrodes 4R, 4G, 4B are only shown for clarity in FIG. 1, but several hundred×several hundred or more pixel electrodes are actually arranged. In this case, the red display pixel electrodes 4R are disposed in (1+3n)th columns (n is an integral number including 0), the green display pixel electrodes 4G are disposed in (2+3n)th columns, and the blue display pixel electrodes 4B are disposed in (3+3n)th columns.

The right end of each of the scan lines 6 is connected to a scan output terminal 10 provided on the upper side of a scan line driving driver mounting region 9 indicated by a dotted line on the right side of the projection 1a of the active substrate 1, via a scan lead wire 8 provided to extend from the right side to lower side (projection 1a) of the display region 3.

The lower end of each of the data lines 7 is connected to a data output terminal 13 provided on the upper side within a data line driving driver mounting region 12 indicated by a dotted line on the left side of the projection 1a of the active substrate 1, via a data lead wire 11 provided on the lower side (projection 1a) of the display region 3.

A scan line electrostatic protection and test circuit 14 is provided in the scan line driving driver mounting region 9. This circuit 14 has first, second and third scan line test terminals 15, 16, 17 provided on the left side within the scan line driving driver mounting region 9. In the driver mounting region 9, a plurality of scan line electrostatic protection and test thin film transistors (hereinafter referred to as SL-E/T transistor) 18 are respectively provided on the lower side of the scan output terminals 10. One source/drain electrode of each of the thin film transistors 18 is connected to the scan output terminal 10 on the upper side thereof. Gate electrodes of the SL-ET transistors (protection elements) 18 are connected to the first scan line test terminal 15 via a first scan line test lead wire 19.

In FIG. 1, the other source/drain electrodes of the odd SL-P/T transistors 18 from the left in the SL-P/T circuit 14 are connected to the second scan line test terminal 16 via a second scan line test lead wire 20. The other source/drain electrodes of the even SL-P/T thin film transistors 18 from the left in the SL-P/T circuit 14 are connected to the third scan line test terminal 17 via a third scan line test lead wire 21.

A data line electrostatic protection and test circuit (DL-P/T circuit) 22 is provided in the data line driving driver mounting region 12. This circuit 22 has first to fourth data line test terminals 23 to 26 provided on the left side within the mounting region 12. A data line electrostatic protection and test thin film transistor or DL-P/T transistor (protection element) 27 is provided on the lower side of each data output terminal 13 in the mounting region 12. One source/drain electrode of the DL-P/T thin film transistor 27 is connected to each of the data output terminals 13 on the upper side thereof. Gate electrodes of the thin film transistors 27 are connected to the first data line test terminal 23 via a first data line test lead wire 28.

In FIG. 1, the other source/drain electrodes of the (1+3n)th DL-P/T thin film transistors 27 from the left in the DL-P/T circuit 22 are connected to the second data line test terminal 24 via a second data line test lead wire 29. The other source/drain electrodes of the (2+3n)th DL-P/T thin film transistors 27 from the left in the circuit 22 are connected to the third data line test terminal 25 via a third data line test lead wire 30. The other source/drain electrodes of the (3+3n)th DL-P/T thin film transistors 27 from the left in the circuit 22 are connected to the fourth data line test terminal 26 via a fourth data line test lead wire 31.

A plurality of scan input terminals 32 are provided on the lower side within the scan line driving driver mounting region 9. The scan input terminals 32 are respectively connected to scan external connection terminals 34 provided on the lower side of the input terminals 32 outside the region 9 via scan lead wires 33 provided on lower side of the input terminals 32. A plurality of data input terminals 35 are provided on the lower side within the data line driving driver mounting region 12. The data input terminals 35 are respectively connected to data external connection terminals 37 provided on the lower side of the data input terminals 35 via data lead wires 36 provided on lower side of the data input terminals 35.

Figure 11:
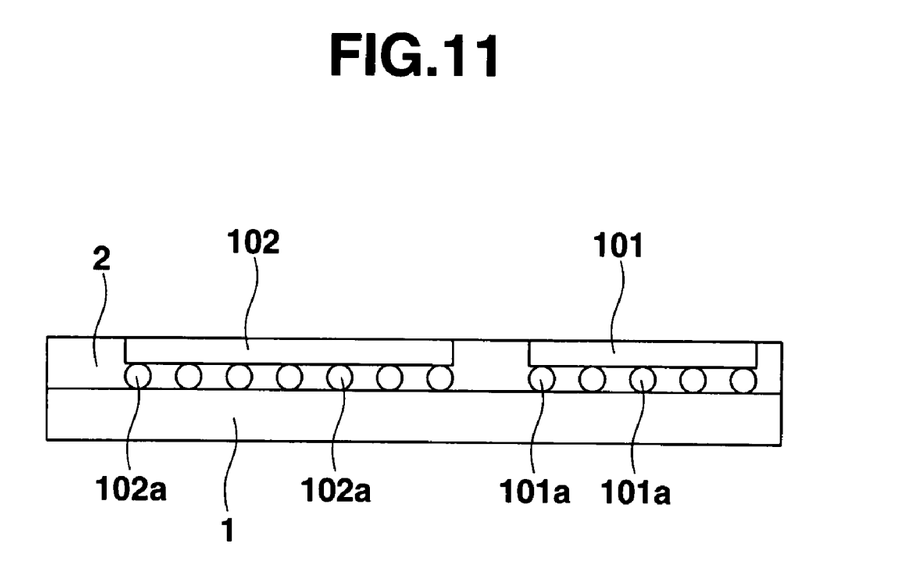
FIG. 11 is an elevation view of a semiconductor device shown in FIG. 1 on which driver chips are mounted.

Although not shown in FIG. 1 for the clarification of the figure, a scan line driving driver chip 101 incorporating a scan line driving circuit unit is mounted on the scan line driving driver mounting region 9 of the active substrate 1 as shown in FIG. 11. External electrodes of this driver chip 101 are respectively bonded to the scan output terminal 10, the first to third scan line test terminals 15 to 17 and the scan input terminals 32 via solder balls 101a by a chip on glass (COG) method. A bonding method may be a method using soldering or a method using an anisotropic conducting adhesive.

Furthermore, a data line driving driver chip 102 incorporating a data line driving circuit unit is mounted on the data line driving driver mounting region 12 of the active substrate 1. External electrodes of this driver chip 102 are bonded to the data output terminal 13, the first to fourth data line test terminals 23 to 26 and the data input terminals 35 via solder balls 102a by the COG method. In this case as well, a bonding method may be the method using soldering or the method using the anisotropic conducting adhesive. Moreover, the above-mentioned scan line driving driver chip and data line driving driver chip may be integrated into one chip instead of being discrete.

Figure 2:
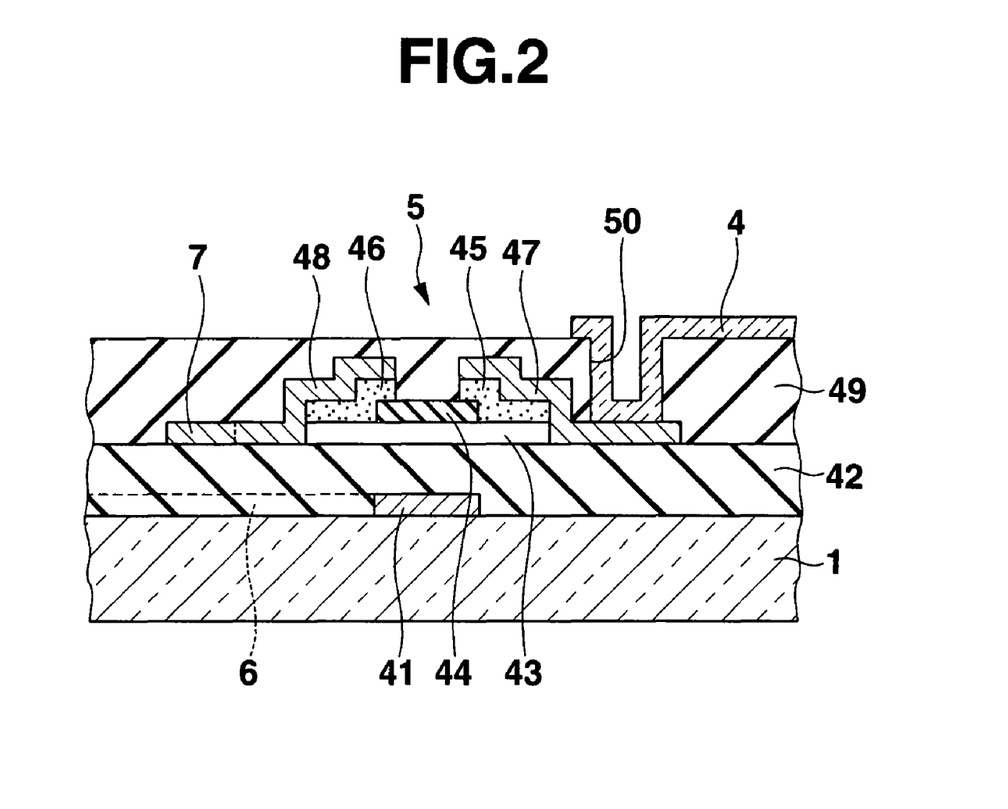
FIG. 2 is a sectional view of the parts of a switching thin film transistor and a pixel electrode shown in FIG. 1.

Next, a specific structure of part of this liquid crystal display will be described with reference to FIGS. 2 to 7. FIG. 2 is a sectional view of the parts of a switching thin film transistor 5 and the pixel electrode 4 (4R, 4G, 4B) shown in FIG. 1. At predetermined places on the upper surface of the transparent active substrate 1 made of, for example, glass, there are provided a gate electrode 41 made of, for example, chromium, the scan line 6 connected to the gate electrode 41, and the scan lead wire 8 (see FIG. 1) connected to the scan line 6.

A gate insulating film 42 made of silicon nitride is provided on the upper surfaces of the gate electrode 41, the scan line 6 and the active substrate 1. A semiconductor thin film 43 made of intrinsic amorphous silicon is provided at a predetermined place on the upper surface of the gate insulating film 42 above the gate electrode 41. A channel protection film 44 made of silicon nitride is provided substantially in the center of the upper surface of the semiconductor thin film 43.

Ohmic contact layers 45, 46 made of n-type amorphous silicon are provided on two sides of the upper surface of the channel protection film 44 and on the upper surface of the semiconductor thin film 43 on both sides of the channel protection film 44. One source/drain electrode 47 made of, for example, chromium is provided at a predetermined place on the upper surface of the one ohmic contact layer 45 and on the upper surface of the gate insulating film 42 in the vicinity of the ohmic contact layer 45. The other source/drain electrode 48 made of, for example, chromium, the data line 7 connected to the other source/drain electrode 48, and the data lead wire 11 (see FIG. 1) connected to the data line 7 are provided at predetermined places on the upper surface of the other ohmic contact layer 46 and on the upper surface of the gate insulating film 42.

Here, the switching thin film transistor 5 is constructed by the gate electrode 41, the gate insulating film 42, the semiconductor thin film 43, the channel protection film 44, the ohmic contact layers 45, 46, and the source/drain electrodes 47, 48.

An overcoat film 49 made of silicon nitride is provided on the upper surfaces of the gate insulating film 42, the thin film transistor 5, the data line 7, etc. The pixel electrode 4 (corresponding to 4R, 4G, 4B) made of a transparent conducting material such as ITO is provided at a predetermined place on the upper surface of the overcoat film 49. The pixel electrode 4 is connected to the one source/drain electrode 47 via a contact hole 50 provided at a predetermined place in the overcoat film 49.

Figure 3:
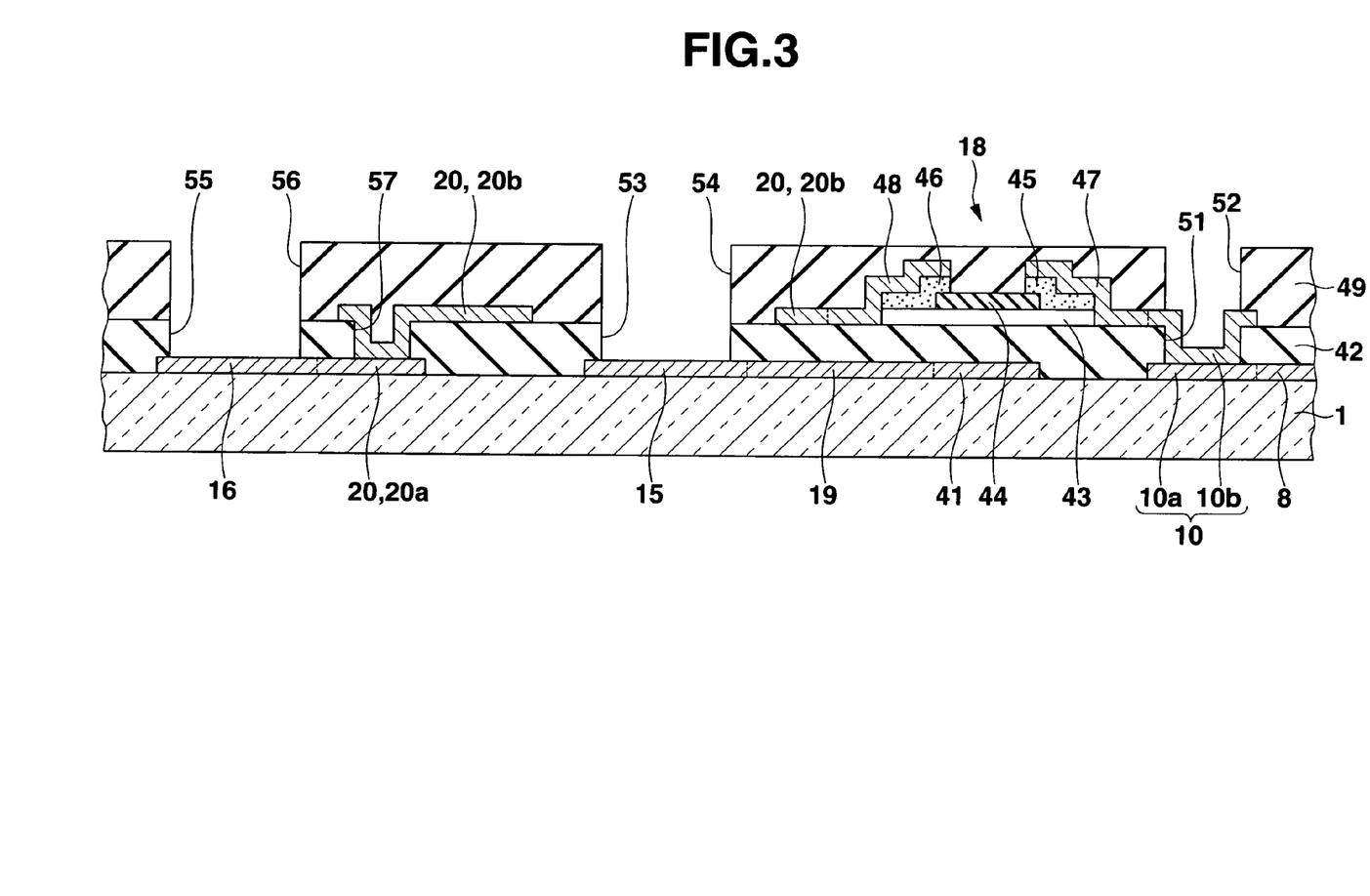
FIG. 3 is a sectional view of the parts of an odd scan output terminal from the left in a scan line driving driver mounting region shown in FIG. 1, a scan line test thin film transistor connected to this scan output terminal, etc.

FIG. 3 is a sectional view of the parts of the odd scan output terminal 10 from the left in the scan line driving driver mounting region 9 shown in FIG. 1, a scan line electrostatic protection and test thin film transistor 18 connected to this scan output terminal 10, etc. The thin film transistor 18 has the substantially same structure as that of the switching thin film transistor 5 shown in FIG. 2, and is constructed by the gate electrode 41, the gate insulating film 42, the semiconductor thin film 43, the channel protection film 44, the ohmic contact layers 45, 46, and the source/drain electrodes 47, 48.

The scan output terminal 10 has a two-layer structure composed of a lower metal layer 10a made of, for example, chromium and provided on the upper surface of the active substrate 1, and an upper metal layer 10b made of, for example, chromium and provided on the upper surface of the lower metal layer 10a exposed via a contact hole 51 provided in the gate insulating film 42 and on the upper surface of the gate insulating film 42 around the contact hole 51. The upper surface of the scan output terminal 10 is exposed via an opening 52 provided in the overcoat film 49.

The first scan line test terminal 15 is made of a metal layer such as chromium provided on the upper surface of the active substrate 1, and the upper surface of the first terminal 15 is exposed via openings 53, 54 respectively provided in the gate insulating film 42 and the overcoat film 49. The second scan line test terminal 16 is made of a metal layer such as chromium provided on the upper surface of the active substrate 1, and the upper surface of the second terminal 16 is exposed via openings 55, 56 provided in the gate insulating film 42 and the overcoat film 49.

The second scan line test lead wire 20 is composed of a lower lead wire 20a (wire extending in a row direction in FIG. 1) made of, for example, chromium provided on the upper surface of the active substrate 1, and an upper lead wire 20b (wire extending in a column direction in FIG. 1) made of, for example, chromium provided on the upper surface the gate insulating film 42. One end of the upper lead wire 20b is connected to the lower lead wire 20a via a contact hole 57 provided in the gate insulating film 42.

The lower metal layer 10a of the scan output terminal 10 is connected to the scan lead wire 8 made of, for example, chromium provided on the upper surface of the active substrate 1. The gate electrode 41 of the SL-P/T thin film transistor 18 is connected to the first scan line test terminal 15 via the first scan line test lead wire 19 made of, for example, chromium provided on the upper surface of the active substrate 1. The one source/drain electrode 47 is connected to the upper metal layer 10b of the scan output terminal 10. The other source/drain electrode 48 is connected to the second scan line test terminal 16 via the second scan line test lead wire 20 composed of the upper lead wire 20b and the lower lead wire 20a.

Figure 4:
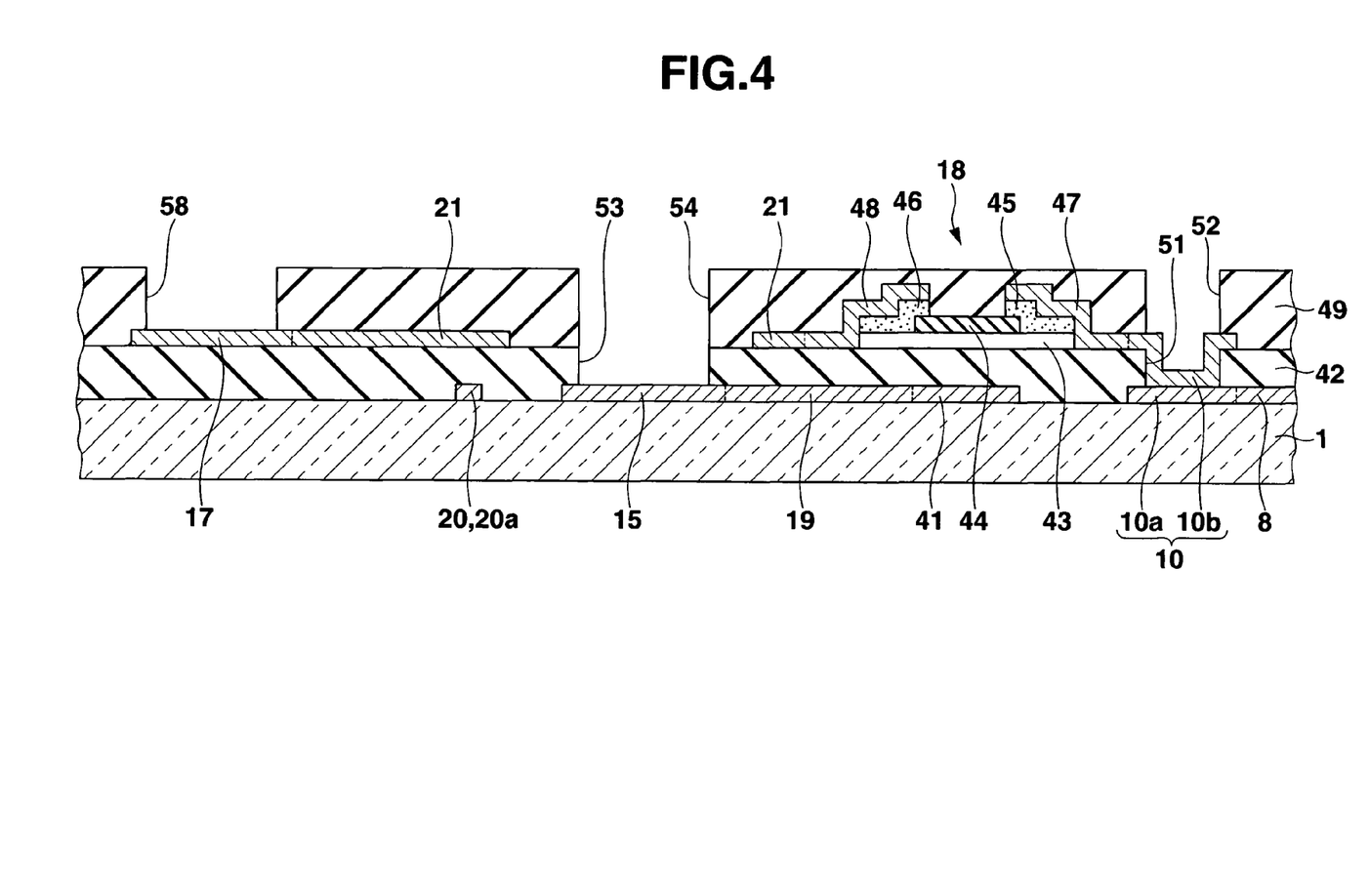
FIG. 4 is a sectional view of the parts of an even scan output terminal from the left in the scan line driving driver mounting region shown in FIG. 1, a scan line test thin film transistor connected to this scan output terminal, etc.

FIG. 4 is a sectional view showing the parts of the even scan output terminal 10 from the left in the scan line driving driver mounting region 9 shown in FIG. 1, the SL-P/T thin film transistor 18 connected to this scan output terminal 10, etc. To only explain the difference between FIG. 4 and FIG. 3, the third scan line test terminal 17 is made of a metal layer such as chromium provided on the upper surface of the gate insulating film 42. Moreover, the other source/drain electrode 48 of the SL-P/T thin film transistor 18 is connected to the third scan line test terminal 17 via the third scan line test lead wire 21 made of, for example, chromium provided on the upper surface of the gate insulating film 42.

In the third scan line test lead wire 21, both a portion 21a extending in the row direction in FIG. 1 and a portion 21b extending in the column direction are formed immediately on the gate insulating film 42. Of these portions, the portion 21b extending in the column direction intersects with the portion (lower lead wire 20a) of the second scan line test lead wire 20 extending in the row direction in FIG. 1, but as the gate insulating film 42 is interposed therebetween, no short circuit is caused.

Figure 5:
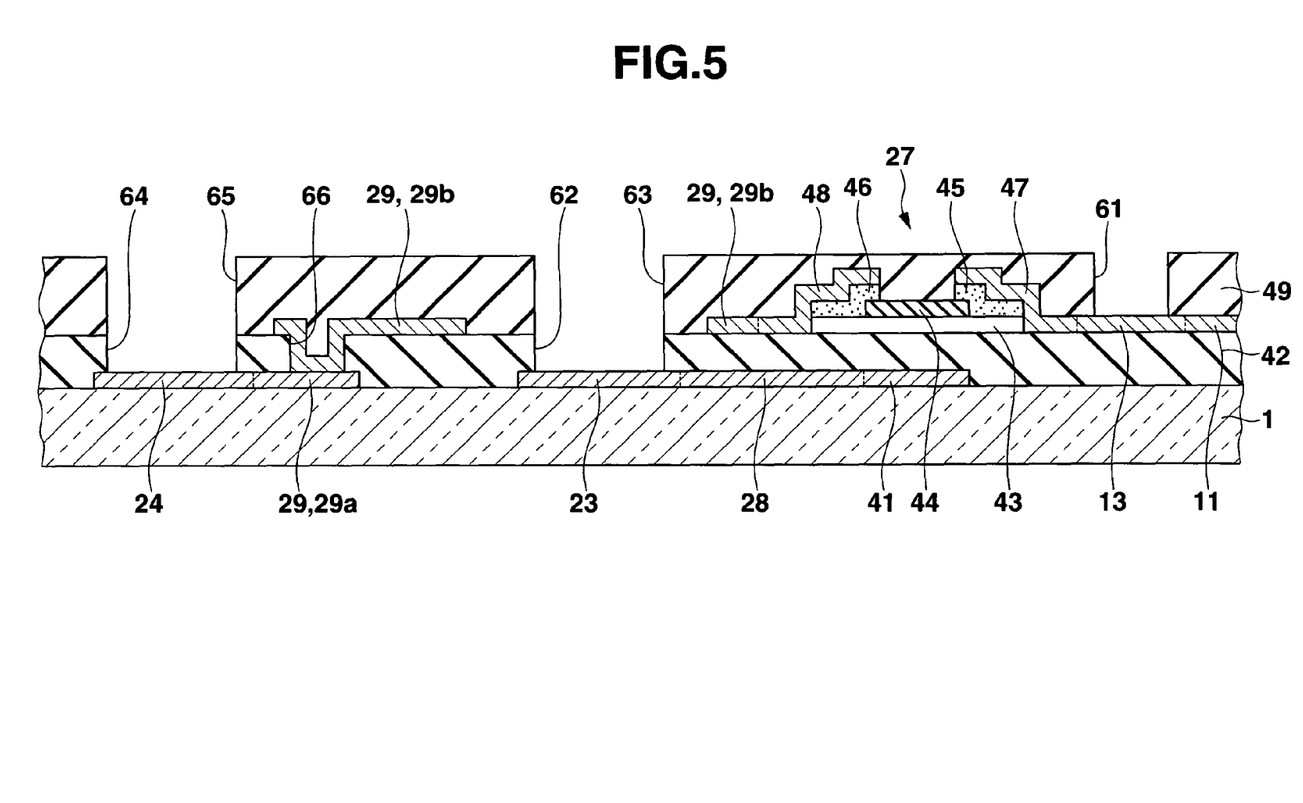
FIG. 5 is a sectional view of the parts of a (1+3)th data output terminal from the left in a data line driving driver mounting region shown in FIG. 1, a data line test thin film transistor connected to this data output terminal, etc.

FIG. 5 is a sectional view showing the parts of the (1+3)th data output terminal 13 from the left in the data line driving driver mounting region 12 shown in FIG. 1, the DL-P/T thin film transistor 27 connected to this data output terminal 13, etc. The DL-P/T thin film transistor 27 has the substantially same structure as that of the switching thin film transistor 5 shown in FIG. 2, and is constructed by the gate electrode 41, the gate insulating film 42, the semiconductor thin film 43, the channel protection film 44, the ohmic contact layers 45, 46, and the source/drain electrodes 47, 48.

The data output terminal 13 is made of a metal layer such as chromium provided on the upper surface of the gate insulating film 42, and the upper layer of this data output terminal 13 is exposed via an opening 61 provided in the overcoat film 49. The first data line test terminal 23 is made of, for example, chromium provided on the upper surface of the active substrate 1, and the upper layer of this first data line test terminal 23 is exposed via openings 62, 63 respectively provided in the gate insulating film 42 and the overcoat film 49. The second data line test terminal 24 is made of, for example, chromium provided on the upper surface of the active substrate 1, and the upper layer of this second terminal 24 is exposed via openings 64, 65 respectively provided in the gate insulating film 42 and the overcoat film 49.

The second data line test lead wire 29 is composed of a lower lead wire 29a (wire extending in the row direction in FIG. 1) made of, for example, chromium provided on the upper surface of the active substrate 1, and an upper lead wire 29b (wire extending in the column direction in FIG. 1) made of, for example, chromium provided on the upper surface of the gate insulating film 42. One end of the upper lead wire 29b is connected to the lower lead wire 29a via a contact hole 66 provided in the gate insulating film 42.

The data output terminal 13 is connected to the data lead wire 11 made of, for example, chromium provided on the upper surface of the active substrate 1. The gate electrode 41 of the DL-P/T thin film transistor 27 is connected to the first data line test terminal 23 via the first data line test lead wire 28 made of, for example, chromium provided on the upper surface of the active substrate 1. The one source/drain electrode 47 is connected to the data output terminal 13. The other source/drain electrode 48 is connected to the second data line test terminal 24 via the second data line test lead wire 29 composed of the upper lead wire 29b and the lower lead wire 29a.

Figure 6:
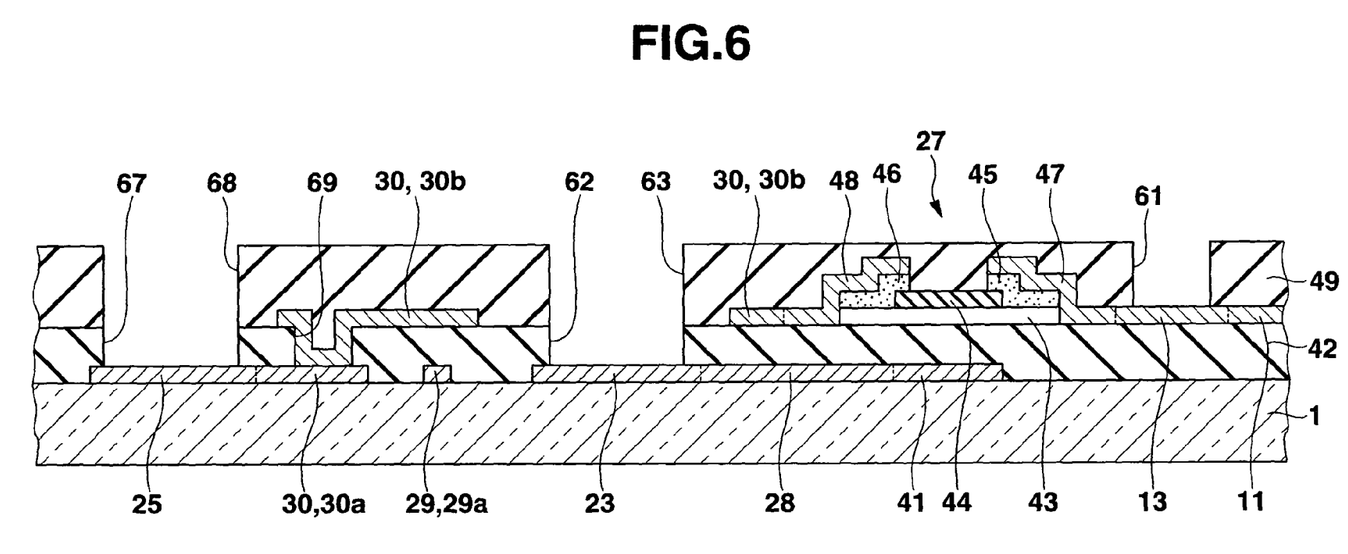
FIG. 6 is a sectional view of the parts of a (2+3)th data output terminal from the left in the data line driving driver mounting region shown in FIG. 1, a data line test thin film transistor connected to this data output terminal, etc.

FIG. 6 is a sectional view showing the parts of the (2+3)th data output terminal 13 from the left in the data line driving driver mounting region 12 shown in FIG. 1, the DL-P/T thin film transistor 27 connected to this data output terminal 13, etc. To only explain the difference between FIG. 6 and FIG. 5, the third data line test terminal 25 is made of a metal layer such as chromium provided on the upper surface of the active substrate 1, and the upper surface of the third terminal 25 is exposed via openings 67, 68 respectively provided in the gate insulating film 42 and the overcoat film 49.

The third data line test lead wire 30 is composed of a lower lead wire 30a (wire extending in the row direction in FIG. 1) made of, for example, chromium provided on the upper surface of the active substrate 1, and an upper lead wire 30b (wire extending in the column direction in FIG. 1) made of, for example, chromium provided on the upper surface of the gate insulating film 42. One end of the upper lead wire 30b is connected to the lower lead wire 30a via a contact hole 69 provided in the gate insulating film 42.

The other source/drain electrode 48 of the DL-P/T thin film transistor 27 is connected to the third data line test terminal 25 via the third data line test lead wire 30 composed of the upper lead wire 30b and the lower lead wire 30a. In this case, the portion (upper lead wire 30b) of the third data line test lead wire 30 extending in the column direction in FIG. 1 intersects with the portion (lower lead wire 29a) of the second data line test lead wire 29 extending in the row direction in FIG. 1, but as the gate insulating film 42 is interposed therebetween, no short circuit is caused.

Figure 7:
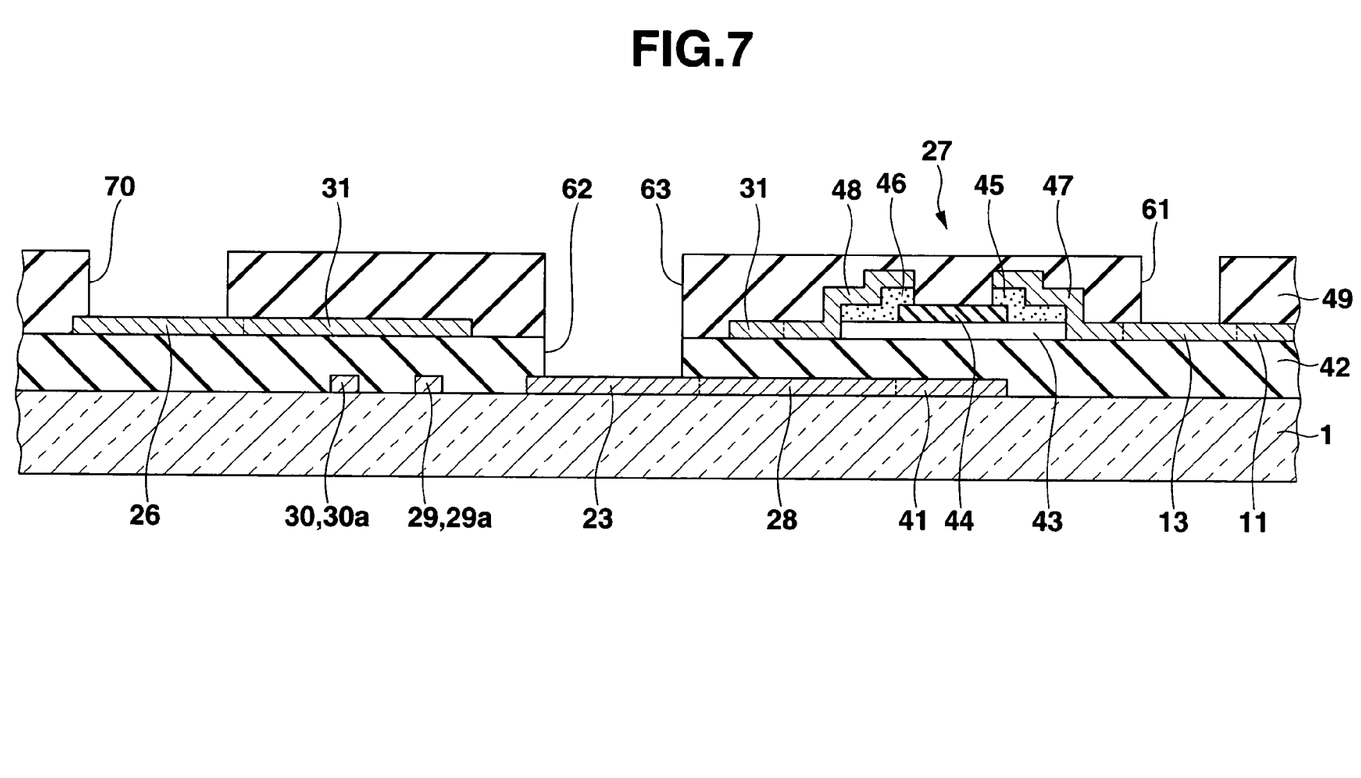
FIG. 7 is a sectional view of the parts of a (3+3)th data output terminal from the left in the data line driving driver mounting region shown in FIG. 1, a data line test thin film transistor connected to this data output terminal, etc.

FIG. 7 is a sectional view showing the parts of the (3+3)th data output terminal 13 from the left in the data line driving driver mounting region 12 shown in FIG. 1, the DL-P/T thin film transistor 27 connected to this data output terminal 13, etc. To only explain the difference between FIG. 7 and FIG. 5, the fourth data line test terminal 26 is made of a metal layer such as chromium provided on the upper surface of the gate insulating film 42, and the upper surface of the fourth terminal 26 is exposed via an opening 70 provided in the overcoat film 49. The fourth data line test lead wire 31 is made of a metal layer such as chromium provided on the upper surface of the gate insulating film 42.

The other source/drain electrode 48 of the DL-P/T thin film transistor 27 is connected to the fourth data line test terminal 26 via the fourth data line test lead wire 31. In this case, a portion 31b of the fourth data line test lead wire 31 extending in the column direction in FIG. 1 intersects with the portion (lower lead wire 29a) of the second data line test lead wire 29 extending in the row direction in FIG. 1 and with the portion (the lower lead wire 30a) of the third data line test lead wire 30 extending in the row direction in FIG. 1, but as the gate insulating film 42 is interposed therebetween, no short circuit is caused.

Next, an electrostatic protection operation in the process of manufacturing the active substrate 1 in the liquid crystal display having the above-mentioned configuration will be explained. In accordance with an experimental result, there was entry of positive static electricity but no entry of negative static electricity in the liquid crystal display having the above-mentioned configuration. In consideration of this situation, measures for the protection from the static electricity were taken against the entry of the positive static electricity. Thus, the following operation is explained in connection with the entry of the positive static electricity. Moreover, a test probe (not shown) is not brought into contact with the first scan line test terminal 15 and the first data line test terminal 23 in the process of manufacturing the active substrate 1. Therefore, the SL-P/T thin film transistor 18 and the DL-P/T thin film transistor 27 are in a floating (non-conductive) state.

Now, assume that positive static electricity has entered one scan line $6_1$ of the odd scan lines $6_{1+2n}$ from the lower side in FIG. 1 from the outside for some reason. Then, the corresponding SL-P/T thin film transistor 18 connected to the scan line $6_1$ via the scan lead wire 8 and the scan output terminal 10 is turned into an on-state (conductive state), and a current flows from the scan line $6_1$ to the second scan line test lead wire 20 via this thin film transistor 18, so that the potential of the second scan line test lead wire 20 becomes high.

When the potential of the second scan line test lead wire 20 becomes high, the SL-P/T thin film transistors 18 connected to all the odd scan lines $6_{1+2n}$ from the lower side in FIG. 1 except for the scan line $6_1$ are brought into a conductive state, and a current flows from the second scan line test lead wire 20 to all the other scan lines $6_{1+2n}$ via the SL-P/T thin film transistors 18, so that all the odd scan lines $6_{1+2n}$ from the lower side in FIG. 1 are at the same potential. This reduces charges applied to each of the switching thin film transistors 5 connected to the odd scan lines $6_{1+2n}$, and can prevent characteristic variations and breakdown of each of the switching thin film transistors 5 and each of the insulating films.

When positive static electricity has entered one scan line $6_2$ of the even scan lines $6_{2+2n}$ from the lower side in FIG. 1 from the outside for some reason, the potential of the third scan line test lead wire 21 becomes high, and all the even scan lines $6_{2+2n}$ from the lower side in FIG. 1 are at the same potential, owing to the electrostatic protection operation as mentioned above. This reduces charges applied to each of the switching thin film transistors 5 connected to the odd scan lines $6_{2+2n}$. Thus, even if the positive static electricity enters the scan line 6 from the outside for some reason, it is possible to prevent faults such as characteristic variations and breakdown caused by the static electricity in the switching thin film transistors 5 and each of the insulating films.

On the other hand, assume that positive static electricity has entered one data line $7_1$ of the (1+3n)th red display data lines $7_{1+3n}$ from the left in FIG. 1 from the outside for some reason. Then, the DL-P/T thin film transistor 27 connected to the data line $7_1$ is brought into a conductive state, and a current flows from the data line $7_1$ to the second data line test lead wire 29 via this thin film transistor 27, so that the potential of this lead wire 29 becomes high.

When the potential of the lead wire 29 becomes high as mentioned above, the DL-P/T thin film transistors 27 connected to all the other data lines $7_{1+3n}$ of the red display data line 7 are brought into a conductive state, and a current flows from the second data line test lead wire 29 to all the rest of the data lines $7_{1+3n}$ via this thin film transistors 27, so that all the red display data lines $7_{1+3n}$ are at the same potential.

When positive static electricity has entered one data line $7_2$ ($7_3$) of the (2+3n)th (or (3+3n)th) green display (or blue display) data lines $7_{2+3n}$ ($7_{3+3n}$) from the left in FIG. 1 from the outside for some reason, the potential of the third data line test lead wire 30 (or the fourth data line test lead wire 31) becomes high, and all the green display (or blue display) data lines 7 are at the same potential, owing to the electrostatic protection operation as mentioned above. Thus, even if the positive static electricity enters the data line $7_{2+3n}$ ($7_{3+3n}$) from the outside for some reason, it is possible to prevent faults such as characteristic variations and breakdown caused by the static electricity in the switching thin film transistors 5 and each of the insulating films.

Next, a method of inspecting the lighting of the liquid crystal display having the above-mentioned configuration will be described. Initially, the test probe (not shown) connected to an inspection apparatus is brought into contact with all the test terminals 15 to 17 and 23 to 26. Then, firstly, for example, a drive voltage is supplied to the second scan line test terminal 16, and drive voltages are also supplied to the second to fourth data line test terminals 24 to 26. In this state, if gate voltages are supplied to the first scan line test terminal 15 and the first data line test terminal 23, pixels corresponding to the pixel electrodes 4R, 4G, 4B in the odd rows from the lower side in FIG. 1 are turned on. When a short circuit is caused between the scan lines 6 adjacent to each other at this moment, pixels corresponding to the pixel electrodes 4R, 4G, 4B in the even rows from the lower side which correspond to the short-circuited part are turned on, and a short-circuit fault between the scan lines 6 adjacent to each other is detected. Moreover, when at least some of the pixel electrodes 4R, 4G, 4B in the odd rows from the lower side are not turned on at this moment, the scan lines 6 in the corresponding rows are broken, so that breaking faults of the scan lines 6 are detected. In the same manner, a drive voltage is supplied not to the second scan line test terminal 16 but to the third scan line test terminal 17, such that it is possible to detect whether a short circuit is caused between the even row from the lower side and the adjacent scan line 6 and whether the scan lines 6 in the even rows from the lower side have been broken.

Secondly, for example, drive voltages are supplied to the second and third scan line test terminals 16, 17, and a drive voltage is supplied to the second data line test terminal 24. In this state, if gate voltages are respectively supplied to the first scan line test terminal 15 and the first data line test terminal 23, pixels corresponding to all the red display pixel electrodes 4R are turned on. When a short circuit is caused between the data lines 7 adjacent to each other at this moment, pixels corresponding to the green display pixel electrodes 4G or the blue display pixel electrodes 4B corresponding to the short-circuited part are turned on, and a short-circuit fault between the data lines 7 adjacent to each other is detected. Moreover, when at least some of the red display pixel electrodes 4R in given columns are not turned on at this moment, the corresponding data lines $7_{1+3n}$ are broken, so that breaking faults of the data lines $7_{1+3n}$ are detected. For the green display pixel electrodes 4G or the blue display pixel electrodes 4B as well, a drive voltage is supplied not to the second data line test terminal 24 but to the third or fourth data line test terminal 25 or 26, such that it is possible to detect a short circuit between the adjacent data lines 7 and breaking faults of the data lines $7_{2+3n}$ or the data lines $7_{3+3n}$ to which the pixel electrodes of the corresponding color display are connected, in the same manner as the red display pixel electrodes 4R.

In this liquid crystal display, the SL-P/T circuit 14, that is, the SL-P/T thin film transistors 18, the first to third scan line test lead wires 19 to 21 and the first to third scan line test terminals 15 to 17 are provided in the scan line driving driver mounting region 9 on the projection 1a outside the display region 3 on the active substrate 1 as shown in FIG. 1, so that there is no need for exclusive regions to arrange these components, and a frame area can be reduced accordingly.

Furthermore, in this liquid crystal display, the DL-P/T circuit 22, that is, the DL-P/T thin film transistor 27, the first to fourth data line test lead wires 28 to 31 and the first to fourth data line test terminals 23 to 26 are provided in the data line driving driver mounting region 12 on the projection 1a outside the display region 3 on the active substrate 1 as shown in FIG. 1, so that there is no need for exclusive regions to arrange these components, and a frame area can be reduced accordingly.

Next will be described part of a case where, in the aforementioned liquid crystal display, a scan line driving driver (not shown) is mounted on the scan line driving driver mounting region 9, and a data line driving driver (not shown) is COG-mounted on the data line driving driver mounting region 12 by a proper method such as face down bonding, so that actual driving is carried out. In this case, external electrodes of the scan line driving driver are connected to the corresponding scan output terminal 10, first to third scan line test terminals 15 to 17 and scan input terminals 32 by a proper connecting material such as solder, an anisotropic conducting material or metal eutectic, and external electrodes of the data line driving driver are electrically connected to the corresponding data output terminal 13, first to fourth data line test terminals 23 to 26 and data input terminals 35.

Then, when a voltage Vg1 (e.g., Vg1=−20 to −15 V) is supplied from the scan line driving driver to the unselected scan line 6 via the scan output terminal 10, the voltage Vg1 is also supplied from the scan line driving driver to the first scan line test terminal 15, and all the SL-P/T thin film transistors 18 are held in an off-state or non-conduction state. Moreover, the voltage Vg1 is also supplied from the scan line driving driver to the second and third scan line test terminals 16, 17, and the potential of the other source/drain electrode of the SL-P/T thin film transistor 18 is held at the voltage Vg1.

In this state, a voltage is sequentially supplied from the scan line driving driver via the scan output terminal 10 and the scan lead wire 8, and each of the scan lines 6 is scanned.

In the actual driving, the switching thin film transistor 5 is turned into an on-state only for a moment, and is in an off-state or non-conduction state most of the time. Therefore, the unselected scan lines 6 are supplied with the voltage Vg1 most of the time. As a result, the voltage Vg1 supplied to the gate electrode of the SL-P/T thin film transistor 18 via the first scan line test terminal 15 is the same as the voltage Vg1 supplied to the unselected scan line 6, such that a leak current from the thin film transistor 18 can be reduced.

Furthermore, the voltage Vg1 supplied to the other source/drain electrode of the SL-P/T thin film transistor 18 via the second and third scan line test terminals 16, 17 is the same as the voltage Vg1 supplied to the one source/drain electrode of the thin film transistor 18 via the scan output terminal 10 connected to the unselected scan line 6, such that a leak current from the thin film transistor 18 can be reduced. A voltage supplied to the second and third scan line test terminals 16, 17 may be a GND potential or a negative potential less than the GND potential.

On the other hand, the voltage Vg1 is supplied from the data line driving driver to the first data line test terminal 23, and all the DL-P/T thin film transistors 27 are held in an off-state or non-conduction state. Moreover, the second to fourth data line test terminals 24 to 26 are supplied with their base voltage (set to LSI-GND) by the data line driving driver, and the potentials of the second to fourth data line test lead wires 29 to 31 are held at the LSI-GND.

In this state, image data is output from the data line driving driver synchronously with the scan timing of the scan lines 6, and supplied to each of the data lines 7 via the data output terminal 13 and the data lead wire 11.

In this case, if all the DL-P/T thin film transistors 27 are held in an off-state, the data lines 7 are separated from each other due to high resistance, so that it is possible to prevent data signals supplied to the data lines 7 via the data output terminals 13 from interfering with each other and reduce a leak current from the thin film transistor 27.

Here, as respectively shown in FIGS. 5 and 6, the second and third data line test lead wires 29, 30 are structured so that one end of each of the upper lead wires 29b, 30b is connected to each of the lower lead wires 29a, 30a via each of the contact holes 66, 69, and the part of each of the contact hole 66, 69 is covered with the overcoat film 49. Thus, the part of the overcoat film 49 in the part of each of the contact holes 66, 69 is subject to defects.

On the other hand, the part of each of the overcoat films 49 in the part of each of the contact holes 66, 69 is covered with the data line driving driver, so that if the overcoat film 49 in the part of each contact hole 66, 69 is defective and there is a potential difference between each of the upper lead wires 29b, 30b in the part of each of the contact holes 66, 69 and the data line driving driver, this causes each upper lead wire 29b, 30b in the part of each contact hole 66, 69 to be corrupted by the movement of ions.

On the contrary, if the voltage LSI-GND is supplied from the data line driving driver to the second to fourth data line test terminals 24 to 26 and the potentials of the second to fourth data line test lead wires 29 to 31 are held at the LSI-GND, no potential difference is made between the upper lead wire 29b, 30b in the part of the contact hole 66, 69 and the data line driving driver, so that the corrosion of the lead wire as mentioned above can be prevented even if the overcoat film 49 in the part of the contact hole 66, 69 is defective.

As shown in FIG. 3, if the second scan line test terminal 16 is provided on the upper surface of the active substrate 1, the second scan line test lead wire 20 has to be structured so that one end of the lower lead wire 20a is connected to the upper lead wire 20b provided on the upper surface of the gate insulating film 42 via the contact hole 57 provided in the gate insulating film 42. Therefore, the contact hole 57 is necessary. A second embodiment described next dispenses with the contact hole 57.

Second Embodiment

Figure 8:
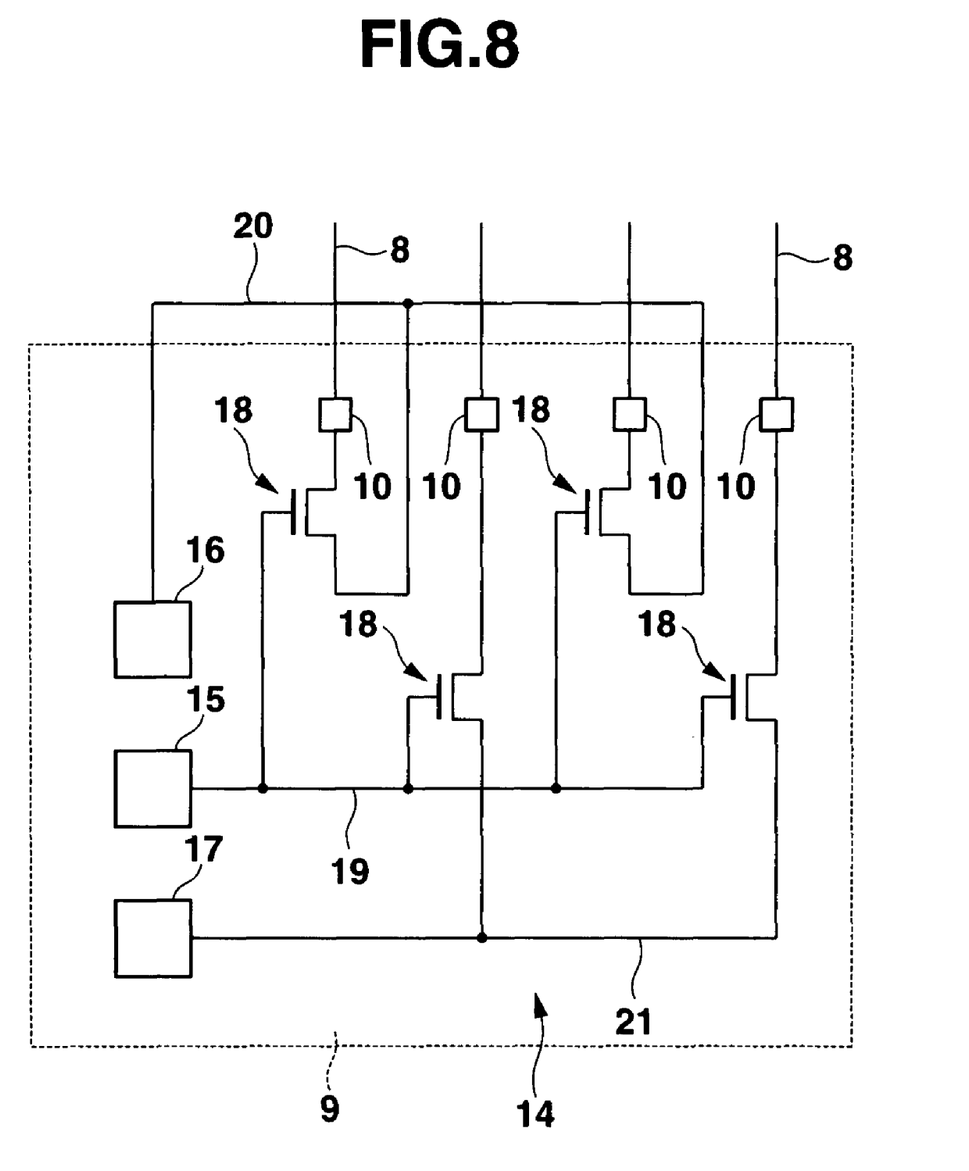
FIG. 8 is a plan view showing an equivalent circuit in part of a scan line driving driver mounting region of a liquid crystal display according to a second embodiment of this invention.
Figure 9:
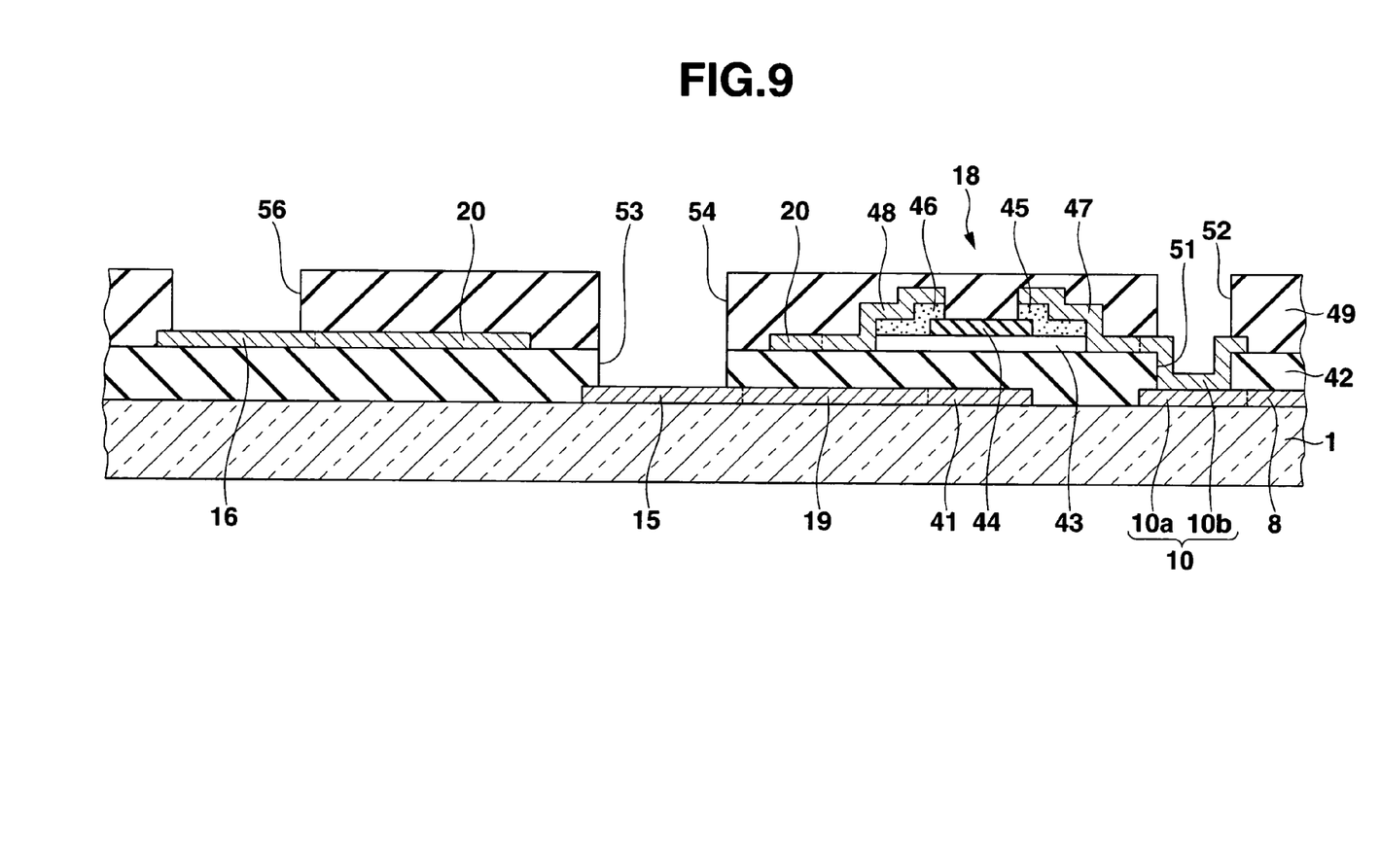
FIG. 9 is a sectional view similar to FIG. 3 of the liquid crystal display according to the second embodiment.

FIG. 8 is a plan view of an equivalent circuit in the part of a scan line driving driver mounting region 9 of a liquid crystal display according to a second embodiment of this invention, and FIG. 9 is a sectional view similar to FIG. 3 of the liquid crystal display according to the second embodiment. First, in this liquid crystal display, a second scan line test terminal 16 is disposed on the upper side of a first scan line test terminal 15, and a common portion of a second scan line test lead wire 20 extending in a row direction is disposed on the upper side of the scan line driving driver mounting region 9, that is, on the side of scan output terminals 10.

In FIG. 8, a plurality of scan line electrostatic protection and test thin film transistors 18 are arranged in a zigzag manner in order to diagrammatically clarify the even thin film transistors 18 from the left and part of the second scan line test lead wire 20 on the upper side thereof. Therefore, the thin film transistors 18 may be arranged in a zigzag manner as shown in FIG. 8, but are preferably arranged linearly as shown in FIG. 1.

Furthermore, as shown in FIG. 9, the second scan line test terminal 16 is made of a metal layer such as chromium provided on the upper surface of a gate insulating film 42, and the upper surface of the second scan line test terminal 16 is exposed via a contact hole 56 formed in an overcoat film 49. Moreover, the other source/drain electrode 48 of a scan line electrostatic protection and test thin film transistor 18 is connected to the second scan line test terminal 16 via the second scan line test lead wire 20 made of, for example, chromium provided on the upper surface of the gate insulating film 42. Thus, the contact hole 57 as shown in FIG. 3 is not necessary.

Figure 10:
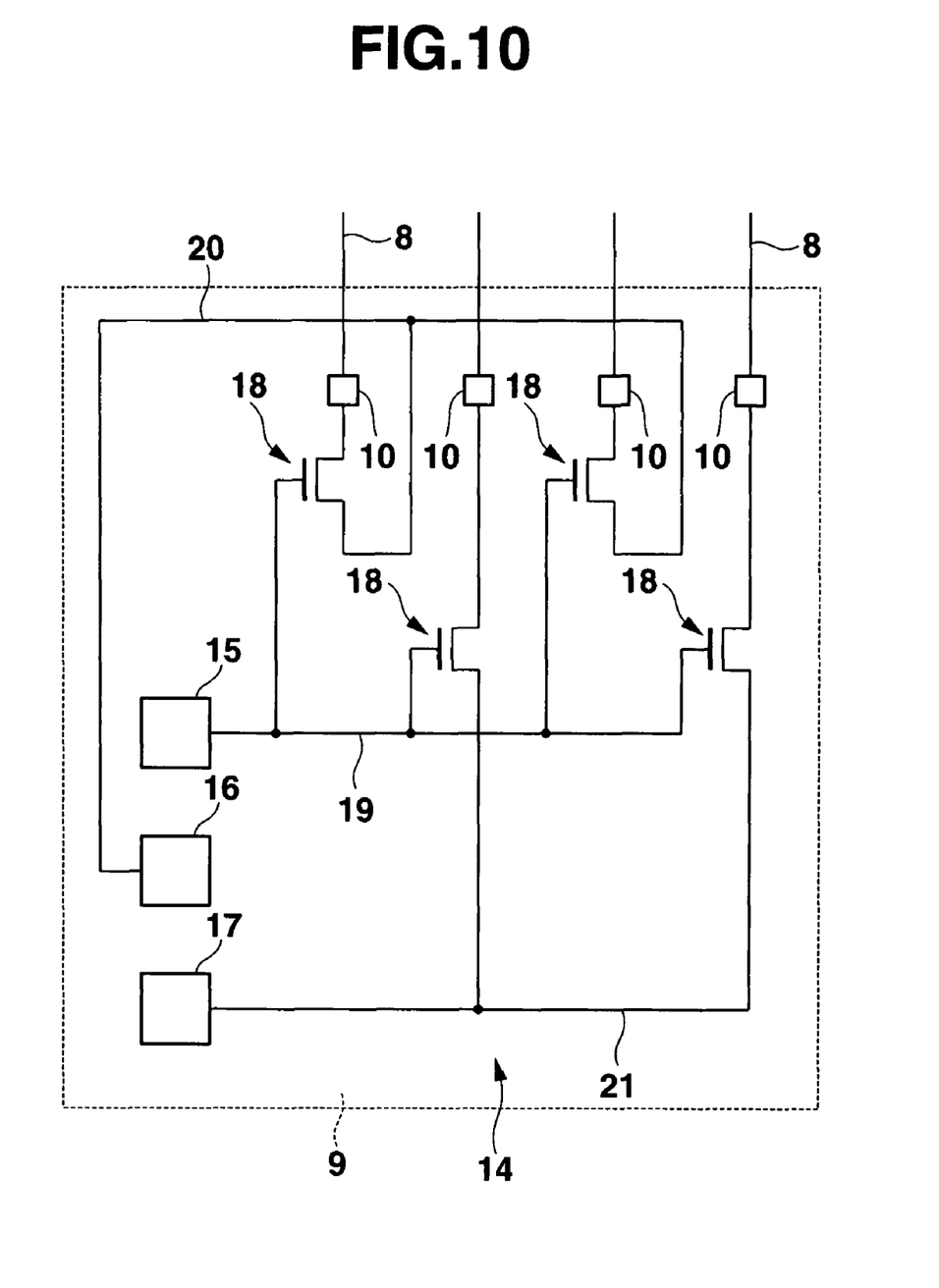
FIG. 10 is a plan view showing an equivalent circuit similar to FIG. 8 to explain a modification of the equivalent circuit shown in FIG. 8.

On the other hand, as shown in FIG. 10, the second scan line test terminal 16 is disposed between the first scan line test terminal 15 and a third scan line test terminal 17, and the second scan line test lead wire 20 is disposed to pass on the left of the first scan line test terminal 15, and the common portion of the second scan line test lead wire 20 extending in a row direction may be disposed on the upper side of the scan output terminals 10 in the scan line driving driver mounting region 9.

Other Embodiments

In FIG. 1, the plurality of SL-P/T thin film transistors 18 are divided into odd ones and even ones from the left in the scan line driving driver mounting region 9 so that a short-circuit fault between scan lines 6 adjacent to each other can be detected as described above. When such a short-circuit inspection is not carried out, the other source/drain electrodes of all the SL-P/T thin film transistors 18 may be connected to the third scan line test terminal 17 via the third scan line test lead wire 21, and the second scan line test lead wire 20 and the second scan line test terminal 16 may be omitted.

In such a case, when static electricity has entered one scan line 6, charges may be dispersed to all the rest of the scan lines 6, so that electrostatic resistance can be improved. Moreover, since the contact hole 57 as shown in FIG. 3 is no longer necessary, the corrosion of a lead wire due to such a contact hole can be prevented.

Furthermore, in FIG. 1, the DL-P/T thin film transistors 27 are divided into red, green and blue displays in the data line driving driver mounting region 12 so that an inspection can be separately carried out for each of red, green and blue as described above. When such a separate inspection for each color is not carried out or when pixel electrodes of a plurality of colors are connected to one data line 6 via the switching thin film transistors 5, the other source/drain electrodes of all the data line electrostatic protection and test thin film transistors 27 may be connected to the fourth data line test terminal 26 via the fourth data line test lead wire 31, and the second, third data line test lead wires 29, 30 and the second, third data line test terminals 24, 25 may be omitted.

In such a case, when static electricity has entered one data line 7, charges may be dispersed to all the rest of the data lines 7, so that electrostatic resistance can be improved. Moreover, since the contact holes 66, 69 as respectively shown in FIGS. 5 and 6 are no longer necessary, the corrosion of the lead wire due to such a contact hole can be prevented. In this case, a voltage supplied to the fourth data line test terminal 26 during actual driving may be a potential around Vsig or Vcom instead of the LSI-GND potential. When the voltage supplied to the fourth data line test terminal 26 during the actual driving is the potential around Vsig or Vcom, a potential difference between the source/drain electrodes of the DL-P/T thin film transistor 27 is smaller, so that a leak current can be further reduced.

Furthermore, while the scan line driving driver mounting region 9 and the data line driving driver mounting region 12 are separate from each other in FIG. 1, one chip incorporating a scan line driving driver and a data line driving driver is available in the market. When such a one-chip driver is used, the scan line driving driver mounting region and the data line driving driver mounting region may be formed continuously from each other.

Still further, while the scan line driving driver mounting region 9 and the data line driving driver mounting region 12 are formed in the projection 1*a* which is one side of the active substrate 1 in FIG. 1, projections may be formed in a plurality of sides of the active substrate so that the scan line driving driver mounting region and the data line driving driver mounting region are formed in each of the projections or the scan line driving driver mounting region is formed in at least one of the projections and the data line driving driver mounting region is formed in at least the other one of the projections.

According to one aspect of the present invention, a scan line electrostatic protection and test circuit is provided in a non-display region on a substrate, so that there is no need for an exclusive region to dispose the scan line electrostatic protection and test circuit, and a frame area can be reduced accordingly.

According to another aspect of the present invention, a data line electrostatic protection and test circuit is provided in the non-display region on the substrate, so that there is no need for an exclusive region to dispose the data line electrostatic protection and test circuit, and the frame area can be reduced accordingly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display comprising:
    a substrate including a display region and a non-display region;
    a plurality of display electrodes arranged on the substrate;
    a plurality of switching elements respectively connected to the display electrodes, each of the switching elements including a control electrode and a data electrode;
    a plurality of scan lines respectively connected to the control electrodes of the switching elements;
    a plurality of data lines respectively connected to the data electrodes of the switching elements;
    a scan line electrostatic protection and test circuit provided in the non-display region and connected to the scan lines, the scan line electrostatic protection and test circuit comprising an electrostatic protection circuit including a plurality of protection elements each of which is normally in a non-conductive state and is set in a conductive state by generated static electricity, and an inspection circuit to inspect a conduction state of the scan lines by way of the protection elements; and
    a plurality of scan output terminals which are connected to a scan line driving driver chip;
    wherein the non-display region includes a scan line driving driver mounting region in which the scan line driving driver chip is mounted; and
    wherein the protection elements are provided in the scan line driving driver mounting region in which the scan line driving driver chip is mounted; and
    wherein the scan output terminals are respectively provided on lead wires which respectively connect the protection elements and the scan lines.

2. The display according to claim 1, wherein a plurality of scan input terminals to which the scan line driving driver chip is electrically connected are provided in the scan line driving driver mounting region.

3. The display according to claim 1, wherein each protection element includes a scan line electrostatic protection and test thin film transistor of which one of source/drain electrodes is connected to each of the scan lines, wherein a first scan line test terminal is connected to a gate electrode of each of the scan line electrostatic protection and test thin film transistors via a first scan line test lead wire, and wherein at least one other scan line test terminal is connected to the other of the source/drain electrodes of the scan line electrostatic protection and test thin film transistor via at least one other scan line test lead wire.

4. The display according to claim 3, wherein each of said scan output terminals is electrically connected to said one of source/drain electrodes.

5. The display according to claim 3, wherein said at least one other scan line test lead wire includes a second scan line test lead wire and a third scan line test lead wire, wherein said at least one other scan line test terminal includes a second scan line test terminal and a third scan line test terminal, wherein odd scan lines of the plurality of scan lines from one side are connected to the second scan line test terminal via the corresponding scan line electrostatic protection and test thin film transistors and the second scan line test lead wire, and even scan lines of the scan lines from the one side are connected to the third scan line test terminal via the corresponding scan line electrostatic protection and test thin film transistors and the third scan line test lead wire.

6. The display according to claim 5, wherein the second scan line test lead wire and the third scan line test lead wire are arranged on a same layer not to intersect with each other.

7. The display according to claim 5, wherein the other source/drain electrodes of all the scan line electrostatic protection and test thin film transistors are connected to the one scan line test terminal via the one scan line test lead wire.

8. The display according to claim 3, wherein a voltage Vg1 is supplied from the scan line driving driver chip to the first scan line test terminal during actual driving of the display.

9. The display according to claim 1, further comprising a data line electrostatic protection and test circuit provided in the non-display region and connected to the data lines, the data line electrostatic protection and test circuit including an electrostatic protection circuit which is normally in an off-state and is conducted by generated static electricity, and an inspection circuit to inspect a conduction state of the data lines and a lighting state of the display electrodes.

10. The display according to claim 9, wherein the data line electrostatic protection and test circuit is provided in a data line driving driver mounting region in which a data line driving driver chip is mounted.

11. The display according to claim 10, wherein a plurality of data output terminals and a plurality of data input terminals to which the data line driving driver chip is connected are provided in the data line driving driver mounting region.

12. A display comprising:
a first thin film transistor provided in a display region;
a driving circuit which supplies a scan signal to the first thin film transistor via a scan line;
a test circuit having a second thin film transistor provided in a region in which the driving circuit is provided; and
a scan output terminal connected to the driving circuit;
wherein the scan output terminal is provided in the region in which the driving circuit is provided and on a lead wire connecting the scan line and the second thin film transistor.

* * * * *